United States Patent
Garcia

(10) Patent No.: US 10,693,348 B2
(45) Date of Patent: Jun. 23, 2020

(54) ENHANCED EFFICIENCY MOTOR AND DRIVE CIRCUIT

(71) Applicant: Reginald Garcia, Helendale, CA (US)

(72) Inventor: Reginald Garcia, Helendale, CA (US)

( * ) Notice: Subject to any disclaimer, the term of this patent is extended or adjusted under 35 U.S.C. 154(b) by 310 days.

(21) Appl. No.: 15/601,784

(22) Filed: May 22, 2017

(65) Prior Publication Data

US 2017/0338721 A1 Nov. 23, 2017

Related U.S. Application Data

(60) Provisional application No. 62/340,326, filed on May 23, 2016.

(51) Int. Cl.

| | |
|---|---|
| *H02K 11/04* | (2016.01) |
| *H02K 11/049* | (2016.01) |
| *H02K 11/33* | (2016.01) |
| *H02K 1/27* | (2006.01) |
| *H02K 11/00* | (2016.01) |
| *H02K 11/02* | (2016.01) |
| *H02K 15/03* | (2006.01) |

(52) U.S. Cl.
CPC ............ *H02K 11/044* (2013.01); *H02K 1/27* (2013.01); *H02K 11/0094* (2013.01); *H02K 11/02* (2013.01); *H02K 11/049* (2016.01); *H02K 11/33* (2016.01); *H02K 15/03* (2013.01)

(58) Field of Classification Search
CPC .... H02K 11/044; H02K 11/049; H02K 11/33; H02K 11/0094; H02K 11/02; H02K 1/27; H02K 15/03
USPC ................................................ 310/156.43
See application file for complete search history.

(56) References Cited

U.S. PATENT DOCUMENTS

| | | | | |
|---|---|---|---|---|
| 4,127,803 A | * | 11/1978 | Etienne ................... | B60L 15/08 320/104 |
| 4,684,867 A | * | 8/1987 | Miller ..................... | H02P 3/065 318/701 |

(Continued)

FOREIGN PATENT DOCUMENTS

| | | |
|---|---|---|
| GB | 1597486 A | 9/1981 |
| JP | 2011259571 A | 12/2011 |

OTHER PUBLICATIONS

International Search Report dated Aug. 7, 2017, for corresponding International Application No. PCT/US2017/033948 filed May 23, 2017; total 2 pages.

(Continued)

*Primary Examiner* — Forrest M Phillips
(74) *Attorney, Agent, or Firm* — David Guerra

(57) ABSTRACT

Improved apparatuses and methods of returning magnetic energy of a motor to the motor system. Improved battery systems and configurations are disclosed to enhance recovery of magnetic energy of a motor, to enhance motor efficiency. A power source has a first pole and a second pole. A phase coil is configured to receive electrical energy from the power source to form a magnetic field for imparting motion to a rotor. A battery has a first pole and a second pole, the first pole of the battery configured to receive energy of the magnetic field of the phase coil, the second pole of the battery being coupled to the first pole of the power source and having a polarity that is opposite a polarity of the first pole of the power source.

20 Claims, 13 Drawing Sheets

(56) References Cited

U.S. PATENT DOCUMENTS

| | | | | |
|---|---|---|---|---|
| 6,087,799 A * | 7/2000 | Turner | ............... | H02P 25/092 |
| | | | | 318/254.2 |
| 6,392,370 B1 * | 5/2002 | Bedini | ............... | H02K 21/24 |
| | | | | 310/113 |
| 6,495,985 B1 * | 12/2002 | Mayes | ............... | H02P 25/092 |
| | | | | 318/701 |
| 6,628,105 B1 * | 9/2003 | Tankard | ............... | H02P 9/40 |
| | | | | 318/701 |
| 6,987,375 B2 * | 1/2006 | Chen | ............... | H02K 19/103 |
| | | | | 318/254.2 |
| 7,268,516 B2 * | 9/2007 | Tankard | ............... | H02P 9/40 |
| | | | | 318/807 |
| 7,957,160 B2 * | 6/2011 | Babcock | ............ | H02M 7/497 |
| | | | | 363/131 |
| 2004/0222756 A1 * | 11/2004 | Crookes | ............. | H02K 21/14 |
| | | | | 388/809 |

OTHER PUBLICATIONS

International Preliminary Report on Patentability dated Nov. 27, 2018, for corresponding International Application No. PCT/US2017/033948 filed May 23, 2017; total 8 pages.

Written Opinion of the International Searching Authority dated Aug. 7, 2017, or corresponding International Application No. PCT/US2017/033948 filed May 23, 2017; total 7 pages.

* cited by examiner

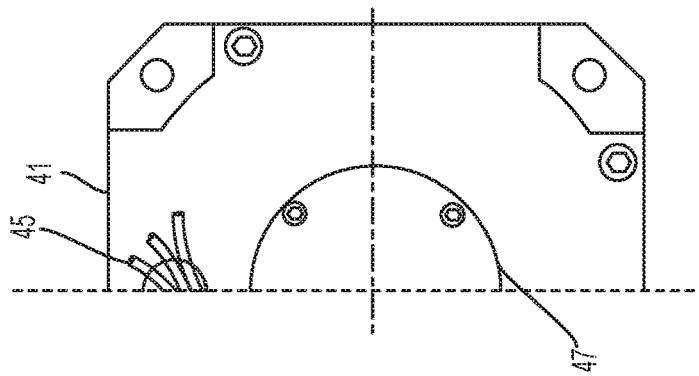
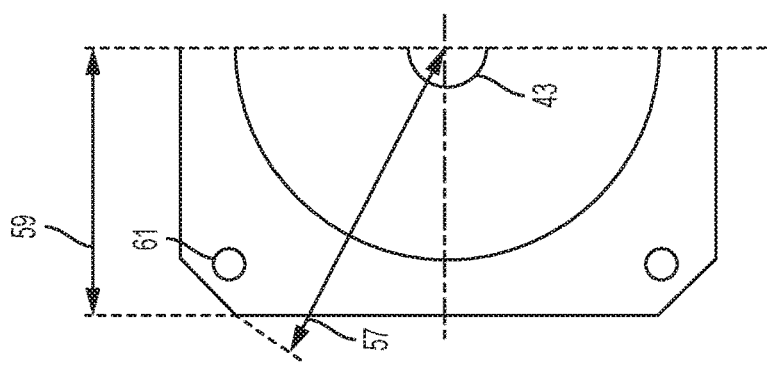
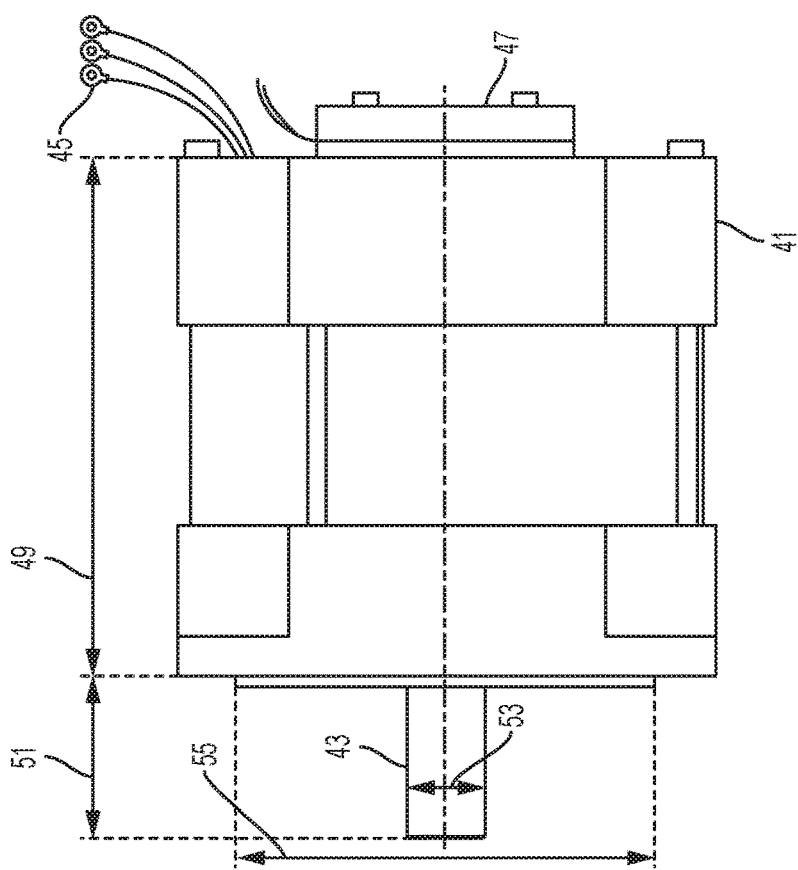

ENHANCED EFFICIENCY MOTOR AND DRIVE CIRCUIT

CROSS REFERENCE TO RELATED APPLICATIONS

The present application claims the benefit of U.S. Provisional Application No. 62/340,326, filed May 23, 2016, the entire contents of which are incorporated herein by reference.

BACKGROUND

Motors commonly utilize a rotor that rotates relative to a stator. Many electric motors cause motion of the rotor through a magnetic field applied to the rotor. Such motors may include switched reluctance motors, variable switched reluctance motors, inductor motors, permanent magnet motors, and the like.

However, standard motors that utilize a magnetic field to rotate a rotor, incur losses by energy lost in the magnetic field. These energy losses may reduce the performance of these motors, resulting in decreased operational efficiencies.

Improved devices, systems, and methods of capturing energy of magnetic fields and reducing energy losses in motors, is desirable.

SUMMARY

Devices, systems, and methods disclosed herein are designed to address the need for improved motor efficiency and capture of magnetic field energy.

In one embodiment, a drive circuit for a motor is disclosed, including a power source having a first pole and a second pole. A phase coil is coupled to the first pole of the power source, the phase coil configured to receive electrical energy from the power source to form a magnetic field for imparting motion to a rotor. A switch couples the phase coil to the second pole of the power source. A battery has a first pole and a second pole, the first pole of the battery configured to receive energy of the magnetic field of the phase coil, the second pole of the battery being coupled to the first pole of the power source and having a polarity that is opposite a polarity of the first pole of the power source.

In one embodiment, a motor is disclosed, including a rotor, and a power source having a first pole and a second pole. A stator includes a phase coil coupled to the first pole of the power source, the phase coil configured to receive electrical energy from the power source to form a magnetic field for imparting motion to the rotor. A switch couples the phase coil to the second pole of the power source. A battery has a first pole and a second pole, the first pole of the battery configured to receive energy of the magnetic field of the phase coil, the second pole of the battery being coupled to the first pole of the power source and having a polarity that is opposite a polarity of the first pole of the power source.

In one embodiment, a method is disclosed, including operating a motor having a drive circuit. The drive circuit includes a power source having a first pole and a second pole. A phase coil is coupled to the first pole of the power source, the phase coil configured to receive electrical energy from the power source to form a magnetic field for imparting motion to a rotor. A switch couples the phase coil to the second pole of the power source. A battery has a first pole and a second pole, the first pole of the battery configured to receive energy of the magnetic field of the phase coil, the second pole of the battery being coupled to the first pole of the power source and having a polarity that is opposite a polarity of the first pole of the power source.

In one embodiment, a drive circuit for a motor is disclosed, including a power source having a first pole and a second pole. A phase coil is coupled to the first pole of the power source, the phase coil configured to receive electrical energy from the power source to form a magnetic field for imparting motion to a rotor. A switch couples the phase coil to the second pole of the power source. A rectifier is coupled to the phase coil and configured to rectify a current resulting from the magnetic field of the phase coil to produce a rectified current. A power storage device is configured to receive the rectified current from the rectifier, and store energy resulting from the rectified current.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 3A illustrates a side view of a motor housing according to an embodiment of the present disclosure.

FIG. 3B illustrates a front view of a half of the motor housing of FIG. 3A taken along a midline.

FIG. 3C illustrates a rear view of a half of the motor housing of FIG. 3A taken along the same midline as in FIG. 3B.

DETAILED DESCRIPTION

Figure 1:
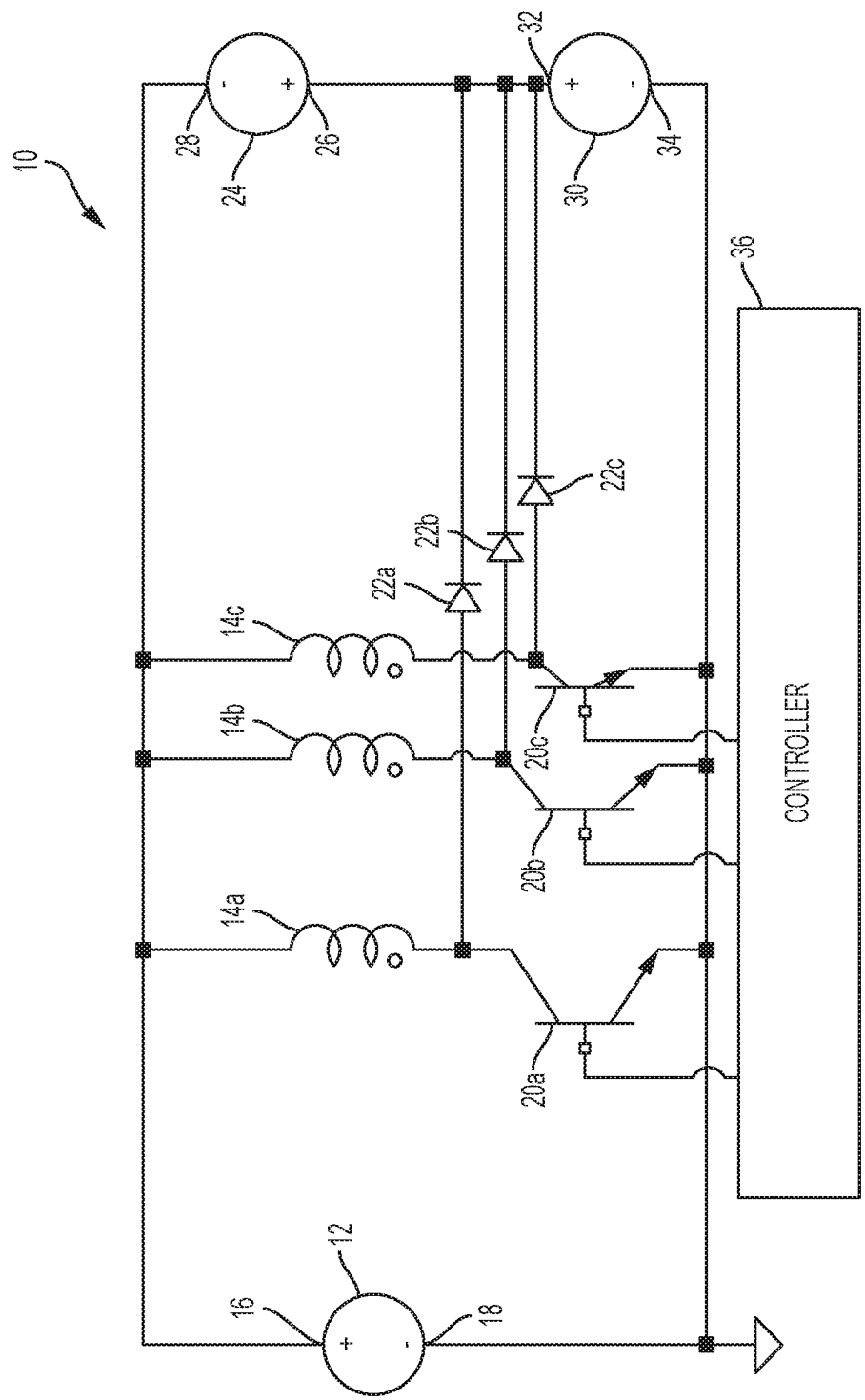
FIG. 1 illustrates a schematic diagram of a drive circuit according to an embodiment of the present disclosure.

FIG. 1 illustrates an embodiment of a drive circuit 10 according to an embodiment of the present disclosure. The drive circuit 10 may be utilized to operate a motor. The motor may be utilized to produce a mechanical output.

The drive circuit 10 may include a power source 12 used to supply power to one or more phase coils 14a, 14b, 14c. The power source 12 may comprise a battery, a DC link, or other form of power source. Preferably, the power source 12 is configured to be rechargeable, and may accordingly comprise a battery or the like. In the embodiment shown in FIG. 1, the power source 12 produces a DC input to the phase coils 14a, 14b, 14c. In other embodiments, an AC input may be provided by power source 12.

The power source 12 includes two poles. As shown in FIG. 1, the power source 12 has poles of opposite polarity, including a positive pole 16 and a negative pole 18. The positive pole 16 may couple to a power source side, or undotted side, of phase coil 14a.

The phase coil 14a may be configured to have an electrical current pass therethrough to form a magnetic field. The current may be drawn from the power source 12 such that the phase coil 14a receives electrical energy from the power source 12 to form the magnetic field. The phase coil 14a may be part of and coupled to a stator, and the magnetic field may be used to impart motion to a rotor. Although phase coil 14a is shown as a single coil, any number of coils or wrappings may comprise phase coil 14a.

A switch 20a may be coupled to the switch side or dotted side of the phase coil 14a. The switch 20a may couple the switch side or dotted side of the phase coil 14a to the negative pole 18 of the power source 12, such that current passes through the phase coil 14a and the switch 20a to reach the negative pole 18 when the switch 20a is closed. The switch 20a may comprise a semiconductor, or mechanical, or electromechanical switch. In an embodiment in which a semiconductor switch is used, a variety of types of semiconductor switches, such as transistors, thyristors, photocells, or other semiconductor switch may be used. In the embodiment shown in FIG. 1, an NPN transistor with a collector coupled to the phase coil 14a and an emitter coupled to the negative pole 18 may be utilized.

A diode 22a may be coupled to the switch side or dotted side of the phase coil 14a. The diode 22a may also be connected to the coil side of the switch 20a. The diode 22a may be forward biased relative to the phase coil 14a. The diode 22a may also serve as a rectifier, to rectify the current produced by the magnetic field of the phase coil 14a to produce a rectified current.

A power storage device may be coupled to the switch side or dotted side of the phase coil 14a via diode 22a. The power storage device may comprise a battery 24. The battery 24 may include two poles. As shown in FIG. 1, the battery 24 has poles of opposite polarity, including a positive pole 26 and a negative pole 28. The positive pole 26 may couple to the phase coil 14a and the negative pole 28 may couple to the positive pole 16 of the power source 12. The battery 24 may comprise a sealed lead acid battery. In other embodiments, other forms of batteries such as nickel cadmium (NiCd), nickel-metal hydride (NiMH), Lithium ion (Li-ion), Lithium ion polymer (Li-ion polymer), reusable alkaline, or other forms of batteries may be used. In an embodiment in which power source 12 comprises a battery, the battery may comprise a sealed lead acid battery. The battery may also comprise other forms of batteries such as nickel cadmium (NiCd), nickel-metal hydride (NiMH), Lithium ion (Li-ion), Lithium ion polymer (Li-ion polymer), reusable alkaline, or other forms of batteries.

Another power storage device may be coupled to the switch side or dotted side of the phase coil 14a via diode 22a. The power storage device may comprise a battery 30. The battery 30 may include two poles. As shown in FIG. 1, the battery 30 has poles of opposite polarity, including a positive pole 32 and a negative pole 34. The positive pole 32 may couple to the phase coil 14a and the negative pole 34 may couple to the negative pole 18 of the power source 12. The battery 30 may comprise a sealed lead acid battery. In other embodiments, other forms of batteries such as nickel cadmium (NiCd), nickel-metal hydride (NiMH), Lithium ion (Li-ion), Lithium ion polymer (Li-ion polymer), reusable alkaline, or other forms of batteries may be used.

When switch 20a is closed, current flows through the phase coil 14a to the negative pole 18 of the power source 12. The current flowing through the phase coil 14a forms a magnetic field, which is used to impart motion to a rotor. Energy is stored in the magnetic field. When the switch 20a is opened, current no longer flows through the switch 20a. The energy of the magnetic field is transferred through the diode 22a to the battery 24. The positive pole 26 of the battery 24 receives the energy of the magnetic field of the phase coil 14a. A resulting voltage across battery 24 charges battery 24. The energy of the magnetic field is transferred to the battery 24 and stored in battery 24. The energy of the magnetic field may also be transferred through the diode 22a to the battery 30. A resulting voltage across battery 30 charges battery 30. The energy of the magnetic field is transferred to the battery 30 and stored in battery 30.

When the switch 20a is again closed, the current again flows therethrough. When the switch 20a is then opened, the battery 24 is again charged. The energy stored in the battery 24 may be input back into the operation of the coils 14a, 14b, 14c, or may be input into power source 12. The energy of the magnetic field accordingly may be returned to the system. The battery 30 may serve to store any excess energy produced when the switches 20a, 20b, 20c are opened, to prevent damage to the circuit, and useful recovery of this energy.

In one embodiment, only battery 24 may be utilized. In other embodiments, battery 30 may be utilized as well.

The pole 28 of the battery 24 is of an opposite polarity than the pole 16 of the power source 12 to which it is connected. In other embodiments, the polarity of each pole 16, 18 of the power source 12, and each pole 26, 28 of the battery 24 may be flipped such that the pole 28 of the battery 24 remains an opposite polarity than the pole 16 of the power source 12 to which it is connected.

Figure 2:
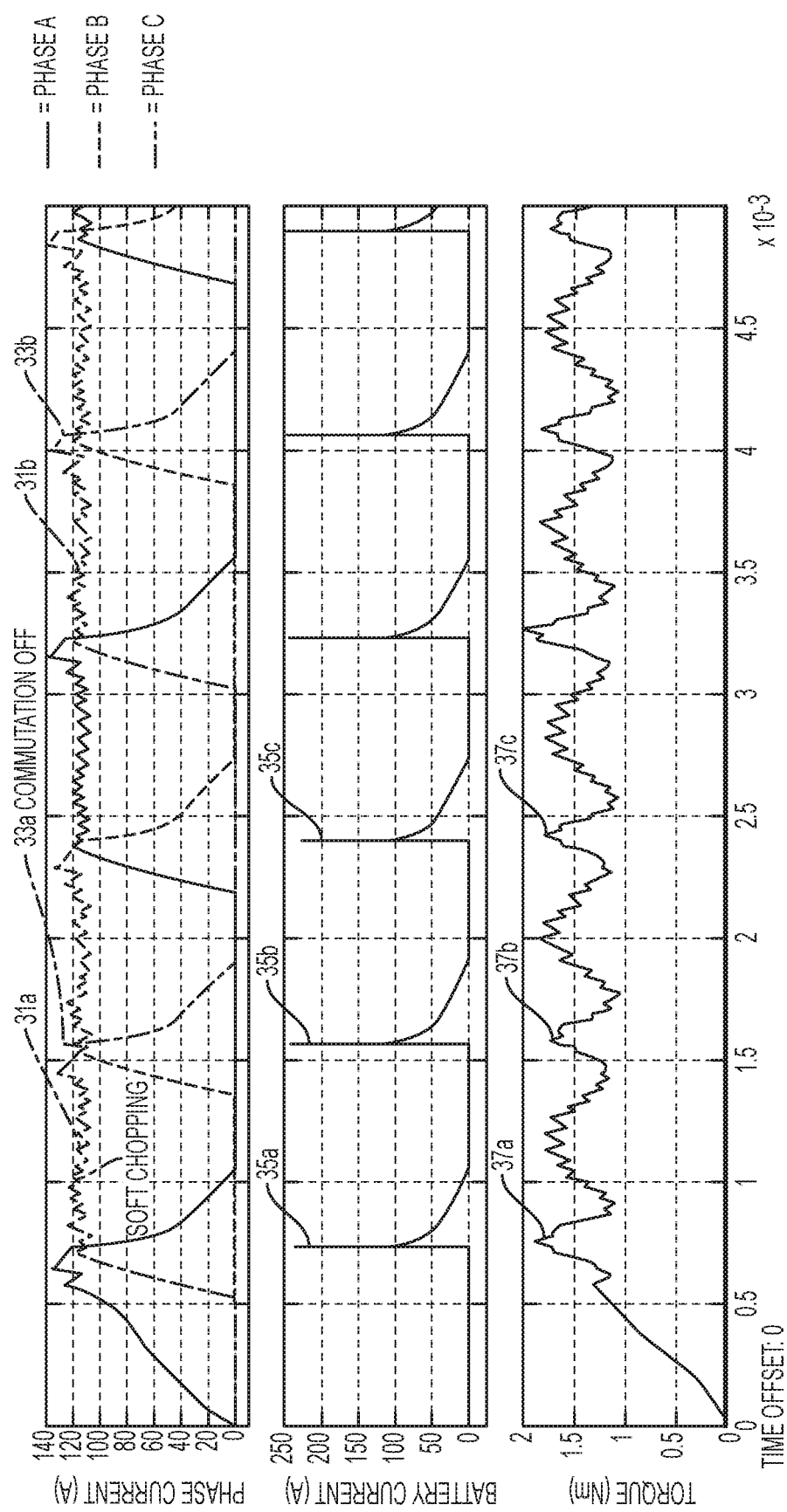
FIG. 2 illustrates a time chart of testing results of an operation and output of a drive circuit according to an embodiment of the present disclosure.

The use of the battery 24, with its pole 28 being of an opposite polarity than the pole 16 of the power source 12, may produce a low torque ripple and a soft chopping, which increases efficiency, as represented in the charts of FIG. 2.

The battery 24 may be configured such that the voltage across the battery 24 is equal to or less than the voltage across the power source 12. Keeping the voltage of the battery 24 equal to or less than the voltage of the power source 12 may provide improved efficiency and operation of the drive circuit 10 and motor. The battery 24 may be structured in a manner such that the voltage of the battery 24 remains equal to or less than the voltage of the power source 12. In an embodiment in which power source 12 is a battery, both power source 12 and battery 24 may be configured such that the voltage across battery 24 is less than or equal to the voltage across power source 12. In one embodiment, the voltage of the battery 24 may be less than the voltage across power source 12.

The drive circuit 10 may be used in a motor of multi-phase configuration, in which multiple coils may be activated in sequence in produce a desired output of the motor. In FIG. 1, three phase activation may be utilized, with the coils 14a, 14b, 14c operating in sequence to effect a desired output of motor. Phase coil 14b may be coupled to switch 20b and diode 22b in a similar manner as phase coil 14a and its respective switch 20a and diode 22a. Phase coil 14c may be coupled to switch 20c and diode 22c in a similar manner as phase coil 14a and its respective switch 20a and diode 22a.

Each phase coil 14b, 14c may be coupled to battery 24 to charge the battery 24 in a similar manner as discussed in regard to coil 14a. The charging of the battery 24 may occur in sequence with the sequential operation of the switches 20a, 20b, 20c. Each phase coil 14b, 14c may be coupled to battery 30 to charge the battery 30 in a similar manner as discussed in regard to coil 14a. The charging of the battery 30 may occur in sequence with the sequential operation of the switches 20a, 20b, 20c. Although FIG. 1 is shown as a three phase configuration, in other embodiment a greater or lesser number of phases may be used.

The drive circuit 10 may be used in a switched reluctance motor or a variable switched reluctance motor. Activation of the coils 14a, 14b, 14c may cause magnetic attraction by the rotor towards a respective coil 14a, 14b, 14c. The activation of coils 14a, 14b, 14c in sequence may create magnetic attraction of the rotor in sequence that causes the rotor to rotate in a desired manner. A controller 36 may be used to open and close each of the switches 20a, 20b, 20c in sequence as desired to produce the desired rotation of the rotor. The controller 36 may be used to control forward, reverse, run time, and speed control through operation of the switches 20a, 20b, 20c. The controller 36 may be configured to be bi-directional, and may include a variable speed control. The controller 36 may be configured to provide a flexible speed control, which may be configured to optimize operation speed based on different kinds of operations and motor applications. The controller 36 may be configured to be programmable to provide the desired operation of the controller 36 and corresponding motor.

The drive circuit 10 may be utilized in a motor of 12/8 configuration, meaning twelve (12) stator poles and eight (8) rotor poles are used. The stator may have a cylindrical shaped outer periphery. The motor may be a switched reluctance motor or a variable switched reluctance motor. In other embodiments, other configurations may be utilized.

FIG. 2 illustrates a time chart of testing results of an operation and output of the drive circuit 10 shown in FIG. 1. FIG. 2 shows a potential output and operation of the drive circuit 10 in a switched reluctance motor of 12/8 configuration, with a stator having a cylindrical shaped outer periphery. The operation and output shown in FIG. 2 may vary according to different configurations and operations of the drive circuit 10 and motor.

For each chart shown in FIG. 2, the time in milliseconds is shown on the horizontal axis.

The uppermost chart shows the phase current through a respective one of the coils 14a, 14b, 14c. The vertical axis of the uppermost chart shows the phase current in amperes. The current through each coil 14a, 14b, 14c is marked with a respective line, with Phase A current shown in solid line, Phase B current shown in dashed lines, and Phase C current shown in a dot-dash line. Phase C, for example, is shown to increase from about zero amperes to a range between 100 and 140 amperes during activation, and then shown to decrease back to about zero amperes as the respective switch 20c is closed, to cut off current flow through the respective coil 14c. Phase C is shown to increase to a soft chopping period 31a until commutation ends 33a. Another period of Phase C's soft chopping 31b occurs after the respective soft chopping and end of commutation periods of Phases B and A. Phase C's soft chopping period 31b occurs until commutation ends 33b.

The middle chart shows the current provided to the battery 24. The vertical axis of the middle chart shows the current to the battery 24 in amperes. The battery current is shown to spike 35a, 35b, 35c at each instance in which the respective switch 20a, 20b, 20c is closed, to cut off current flow through the respective coil 14a, 14b, 14c. The energy of the magnetic field of the respective coil 14a, 14b, 14c is accordingly provided to the battery 24 at each instance of a spike 35a, 35b, 35c shown in the middle chart of FIG. 2.

The bottommost chart shows the torque provided by the rotor of the drive circuit 10. The vertical axis of the bottommost chart shows the output torque in Newton-meters. The torque varies between about 1 Newton-meter and 2 Newton-meters. A torque spike 37a, 37b, 37c appears at each instance in which the respective switch 20a, 20b, 20c is closed, to cut off current flow through the respective coil 14a, 14b, 14c.

The drive circuit 10 may result in motor efficiencies of power input to power output of 96% and above. In an embodiment in which the drive circuit 10 is used in a motor of 12/8 configuration, with a stator having a cylindrical shaped outer periphery, and with about a 66 millimeter (mm) long rotor and stator, about 97.1% efficiency may result with a 4,500 Watt output at 3000 rotations per minute (RPM). In an embodiment in which the drive circuit 10 is used in a motor of 12/8 configuration, with a stator having a cylindrical shaped outer periphery, and with about a 71 millimeter long rotor and stator, about 98% efficiency may result with a 1,500 Watt output at 3000 rotations per minute (RPM). Improved efficiencies are also seen at various power output levels (lesser and greater than 4,500 Watts and 1,500 Watts) and motor configurations.

FIG. 3A illustrates a side view of a motor housing 41 according to an embodiment of the present disclosure. The motor housing 41 may house a stator and rotor. The stator and rotor may be in a 12/8 configuration, and the stator may have a cylindrical shaped outer periphery. A shaft 43 may extend out from the housing 41 for delivering rotational power from the rotor.

The motor housing 41 may be utilized in combination with the drive circuit 10 shown in FIG. 1. The batteries 24, 30, power source 12, and controller 36, may be positioned external to the motor housing 41. Electrical connectors 45 may be used for coupling to the controller 36. A position sensor 47 may be utilized, to determine the position of the rotor and provide such information to the controller 36. The position sensor 47 may comprise a resolver, a hall effect sensor, or other form of position sensor. In other embodiments, the position sensor 47 may not be utilized. In one embodiment, the batteries 24, 30, power source 12, and controller 36 may be positioned internal of the housing 41. In one embodiment, the controller 36 may control the motor either remotely or on-site.

The dimensions of the motor housing 41 may be as follows. The length of the stator and rotor may be about 60 millimeters. In one embodiment, the length of the stator and rotor may be 66 millimeters. The length 49 of the motor housing 41 including the end bells may be about 140 millimeters. In one embodiment, the length 49 may be 138 millimeters. The length 51 of the shaft 43 extending outward from the motor housing 41 may be about 50 millimeters. The diameter 53 of the shaft 43 may be about 25 millimeters. The diameter 55 of the interior rotor cavity of the stator (excluding the stator poles) may be about 130 millimeters.

FIG. 3B illustrates a front view of a half of the motor housing 41 taken along a midline. The outer diameter (twice reference number 57) of the motor housing 41 may be about 210 millimeters. The width of the motor housing 41 (twice reference number 59) may be about 165 millimeters. In one embodiment, the width of the motor housing 41 may be 166 millimeters. A diameter 61 of an aperture for connecting plates of the motor housing 41 may be about 11 millimeters.

FIG. 3C illustrates a rear view of a half of the motor housing 41 taken along the midline of FIG. 3B.

The dimensions of the motor housing 41 and components thereof may be varied as desired. A motor and motor housing 41 as shown in FIGS. 3A-3C may be utilized with any drive circuit disclosed in this application.

Referring back to FIG. 1, in one embodiment, the power storage device comprising either the battery 24 or the battery 30 may comprise an alternative form of power storage device, such as a capacitor, including a polarized capacitor. In other embodiments, other forms of power storage devices may be utilized. Power source 12, in one embodiment, may comprise an alternative form of power source, such as a solar panel, or other form of power source.

In the embodiment shown in FIG. 1, the power of the battery 24 is returned back into the system for use to operate the motor. In other embodiments, the power of the battery 24 or battery 30 may be drawn to an external source for powering an external device. Either of the battery 24 or battery 30 may be configured with terminals such as jumpers, or other forms of terminals, allowing for removal from the system, or a linkage to a separate device. In an embodiment in which drive circuit 10 is used with motor housing 41 of FIGS. 3A-3C, the batteries 24, 30 may be positioned external to motor housing 41 and configured with terminals for connecting and providing power to an external device.

The drive circuit 10 may be used in combination with a rotor and stator to produce a desired motor. The scope of this disclosure is not limited to the devices and systems disclosed herein, but additionally includes the methods of providing these devices and systems, as well as the method of operating these devices and systems. For example, a method may include operating or providing a motor having the drive circuit 10. The motor may be operated such that the voltage of the battery 24 is less than or equal to, or only less than, the voltage of the power source 12. The motor may be operated such that the voltage of the battery 24 is maintained to be less than or equal to, or only less than, the voltage of the power source 12. The motor may be operated such that the voltage of the battery 24 is variable, yet remains less than or equal to, or only less than, the voltage of the power source 12. The method may include operating the motor such that the energy of one or both of the batteries 24, 30 is returned back to the power source 12 or back into the coils 14a, 14b, 14c.

The drive circuits, rotors, and stators discussed herein may not only be used in a switched reluctance motor or variable switched reluctance motor, but may also be used in an AC inductance motor configuration, or a permanent magnet motor configuration, among other motor types.

Figure 4:
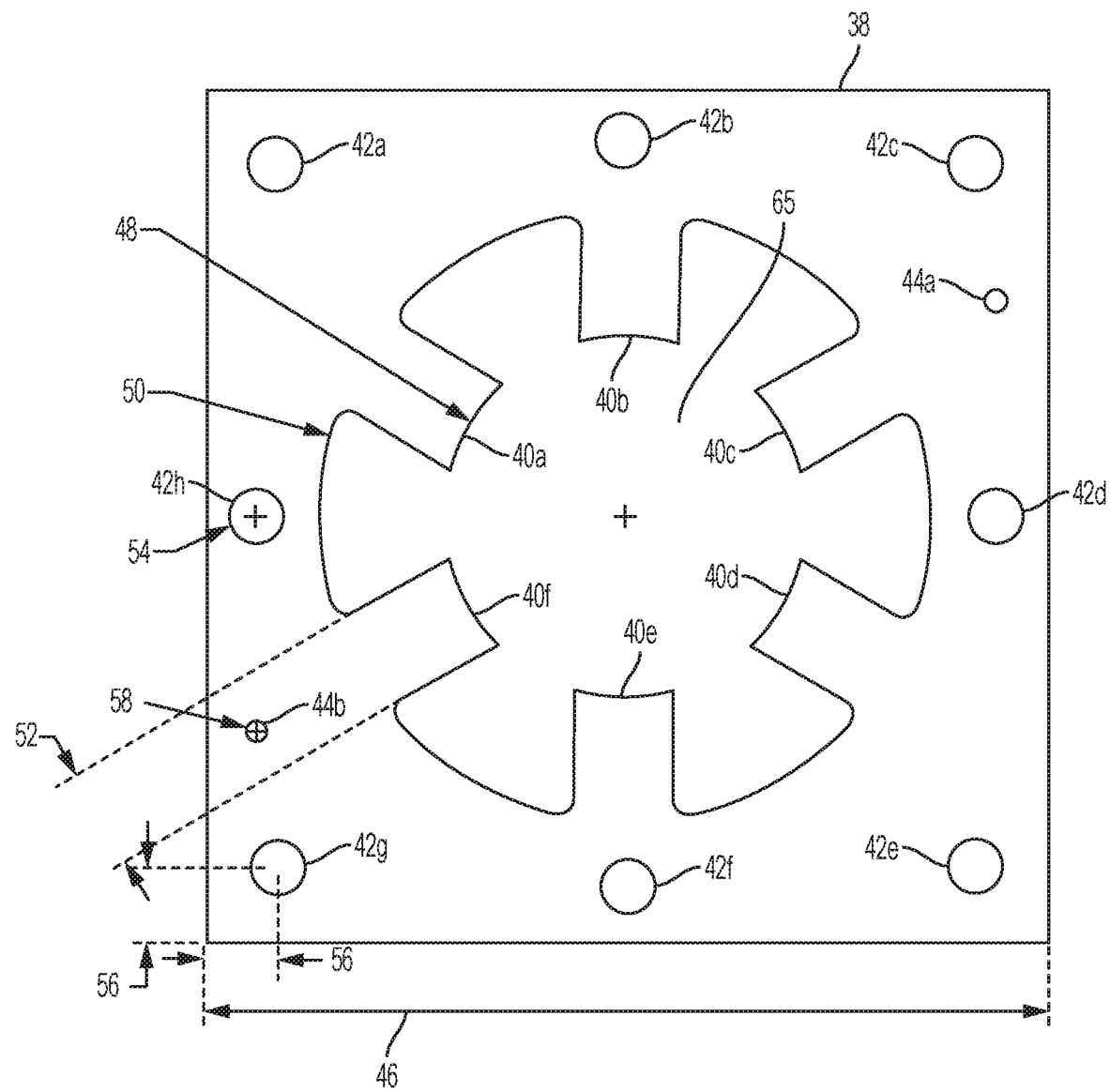
FIG. 4 illustrates a plan view of a stator according to an embodiment of the present disclosure.

FIG. 4 illustrates an embodiment of a stator 38 that may be used with a drive circuit disclosed in this application. The stator 38 has a square shaped outer periphery. The square shaped outer periphery is different than the cylindrical shape of the outer periphery of the stator discussed in regard to FIGS. 3A-3C. The stator 38 may include six stator poles 40a, 40b, 40c, 40d, 40e, 40f positioned symmetrically about the interior rotor cavity 65. The stator poles 40a-40f protrude inward towards the center of the interior rotor cavity 65, each having a substantially rectangular shape with a curved surface facing the interior rotor cavity. A series of apertures 42a, 42b, 42c, 42d, 42e, 42f, 42g, 42h may be positioned about the stator between the interior rotor cavity 65 and the outer periphery of the stator 38. The apertures 42a-42h may be used to connect stator plates to each other to form the stator 38. Additional apertures 44a, 44b may be used to connect stator plates to each other to form the stator 38.

The squared shape of the stator 38 may beneficially improve the application of a magnetic field to a rotor provided by the coils wrapped on the stator poles 40a-40f. Improved magnetic flux lines may result from the enhanced surface area between the interior rotor cavity 65 and the square shaped outer periphery. The square shaped outer periphery may also keep the stator plates from shifting, which may lower noise that may be due to the reaction of the magnetic fields of the coils with connecting bolts of the stator plates. The square shaped outer periphery may also reduce manufacturing costs and part counts by reducing the need for a motor housing. The rotor (shown in FIG. 6) pole pitch may also provide a large maximum inductance region in the phase-induction profile to provide additional time to remove currents.

The dimensions of the stator 38 may be as follows. The width 46 of the stator 38 may be about 10 inches. The height of the stator 38 may also be about 10 inches. The diameter 48 between opposing stator poles, or the interior diameter of the interior rotor cavity 65, may be about 4.3 inches. In one embodiment, the diameter 48 may be 4.317 inches. The outer diameter 50 of the interior rotor cavity 65 (which excludes the stator poles) may be about 7.2 inches. In one embodiment, the outer diameter 50 may be 7.250 inches. The width 52 of a stator pole may be about 1.2 inches. In one embodiment, the width 52 may be about 1.1760 inches. The diameter 54 of the apertures 42a-42h may be about 0.63 inches. In one embodiment, the diameter 54 may be about 0.6250 inches. The offset 56 of the center of the corner apertures 42a, 42c, 42e, 42g from the outer periphery of the stator 38 may be about 0.88 inches. In one embodiment, the offset 56 may be about 0.8750 inches. The diameter 58 of the additional apertures 44a, 44b may be about 0.25 inches.

In other embodiments, the configuration, or dimensions, of the stator 38 may be varied as desired.

Figure 5:
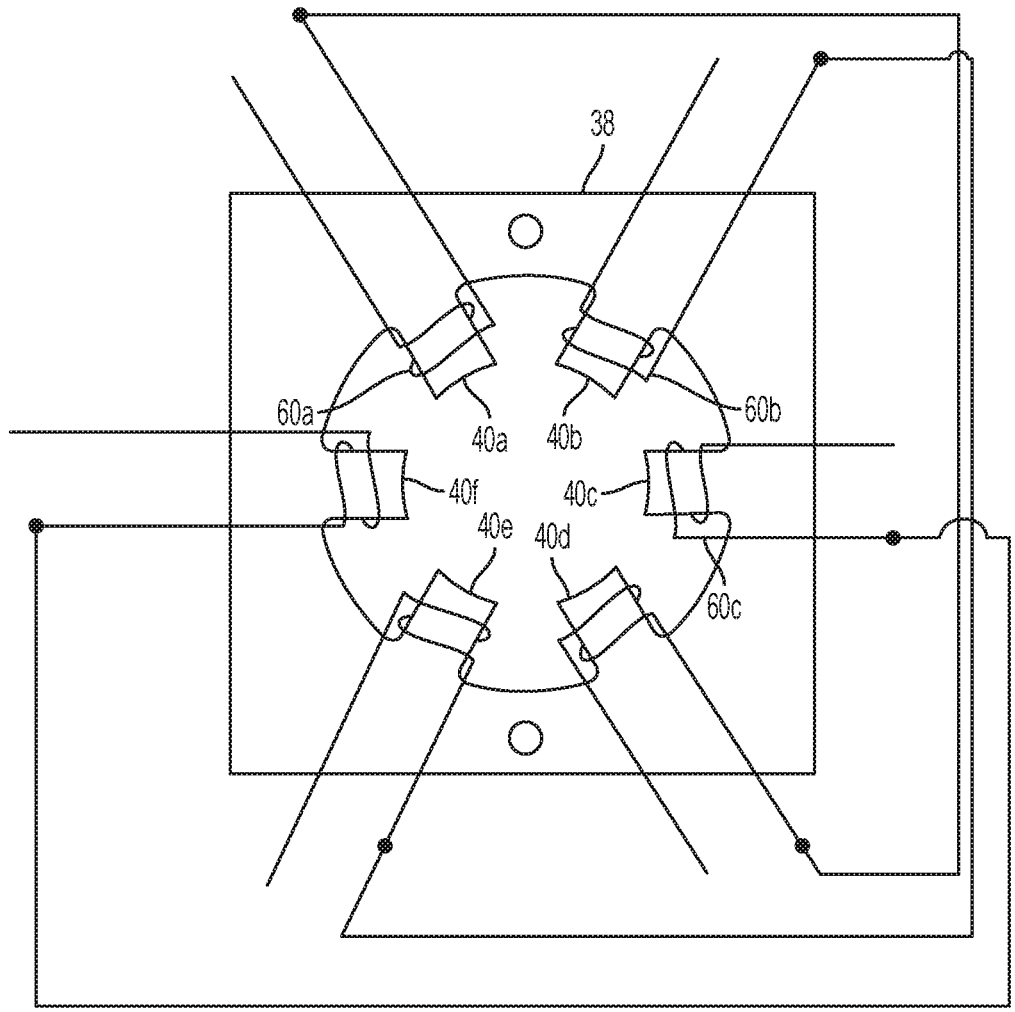
FIG. 5 illustrates a schematic diagram of a wiring diagram of a stator according to an embodiment of the present disclosure.

FIG. 5 illustrates an embodiment of phase coils 60a, 60b, 60c wrapped about the stator poles of the stator 38. The phase coil 60a may be wrapped around stator pole 40a. The wiring of phase coil 60a may be connected to an opposing coil on the opposing stator pole 40d. The phase coil 60b may be wrapped around stator pole 40b. The wiring of phase coil 60b may be connected to an opposing coil on the opposing stator pole 40e. The phase coil 60c may be wrapped around stator pole 40c. The wiring of phase coil 60c may be connected to an opposing coil on the opposing stator pole 40f. The phase coils 60a, 60b, 60c may be wired such that each is activated in sequence, to form rotating magnetic attraction for a rotor positioned within the interior rotor cavity. The phase coils 60a, 60b, 60c may correspond in structure and operation to the phase coils 14a, 14b, 14c discussed in regard to FIG. 1.

Figure 6:
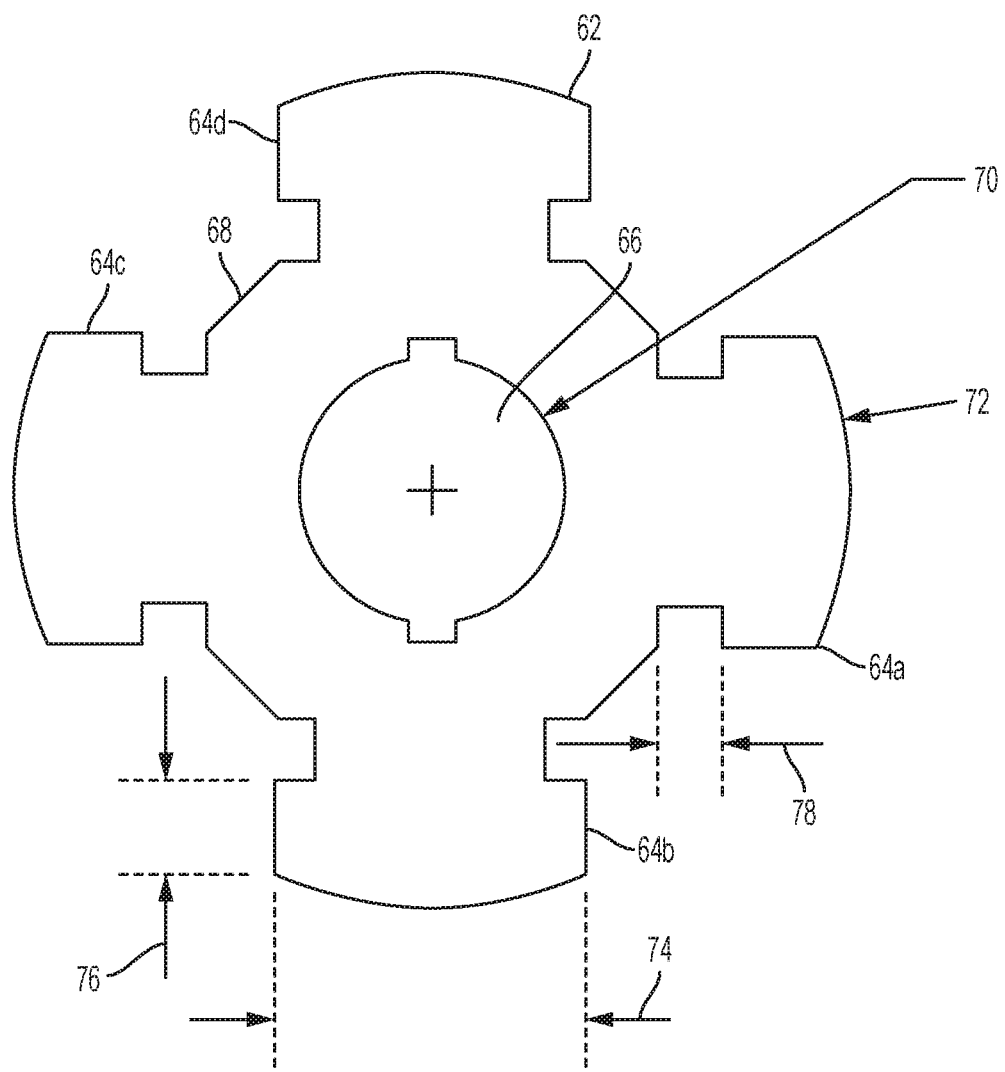
FIG. 6 illustrates a plan view of a rotor according to an embodiment of the present disclosure.

FIG. 6 illustrates an embodiment of a rotor 62 that may be used with a drive circuit disclosed in this application. The rotor 62 includes four rotor poles 64a, 64b, 64c, 64d extending outward symmetrically from the central aperture 66 of the rotor 62. The rotor 62 includes an octagonally shaped central portion 68 with t-shaped structures extending outward from the central portion 68 to form the rotor poles 64a-64d. The outer periphery of the rotor poles 64a-64d may have a curved shape, which may match the curved shape of the stator poles 40a-40f. The t-shaped structures may comprise tabs extending in a substantially perpendicular direction from the direction that the stator poles extend from the central portion 68. The tabs may beneficially provide additional time to remove currents, and may provide a large overlap region with the stator poles 40a-40f.

The dimensions of the rotor 62 may be as follows. The diameter 70 of the central aperture of the rotor 66 may be about 1.38 inches. In one embodiment, the diameter 70 may be 1.3750 inches. The diameter 72 of the outer periphery of the rotor poles 64a-64d (from the outer surface of pole 64a to the outer surface of pole 64c, and also the outer surface of pole 64b to the outer surface of pole 64d) may be about 4.3 inches. In one embodiment, the diameter 72 may be 4.3280 inches.

The width 74 of the rotor poles 64a-64d may be about 1.67 inches. In one embodiment, the width 74 may be 1.6680 inches. The height 76 of each head of a respective rotor pole 64a-64d may be about 0.49 inches. In one embodiment, the height 76 of each head may be 0.4908 inches. The offset height 78 of each head of a respective rotor pole 64a-64d from the central portion 68 may be 0.31 inches. In one embodiment, the offset height 78 may be 0.3120 inches.

In other embodiments, the configuration, or dimensions, of the rotor 62 may be varied as desired.

In one embodiment, the dimensions of the stator 38 and a corresponding rotor 62 may be as follows. The width 46 of the stator 38 may be about 4 inches. The inner diameter 48 of the stator 38 may be about 1.73 inches. In one embodiment, the inner diameter 48 may be 1.7268 inches. The outer diameter 50 of the stator 38 may be about 2.9 inches. The width 74 of the rotor poles 64a-64d may be about 0.67 inches. In one embodiment, the width 74 may be 0.6672 inches. The offset height 78 of each head of a respective rotor pole 64a-64d may be about 0.12 inches. In one embodiment, the offset height 78 of each head of a respective rotor pole 64a-64d may be about 0.1248 inches. The offset height 78 of each head of a respective rotor pole 64a-64d may be about 0.12 inches. The diameter 70 of the central aperture of the rotor 66 may be about 0.55 inches. The diameter 72 of the outer periphery of the rotor poles 64a-64d may be about 1.73 inches. In one embodiment, the diameter 72 of the outer periphery of the rotor poles 64a-64d may be 1.7312 inches.

Figure 7:
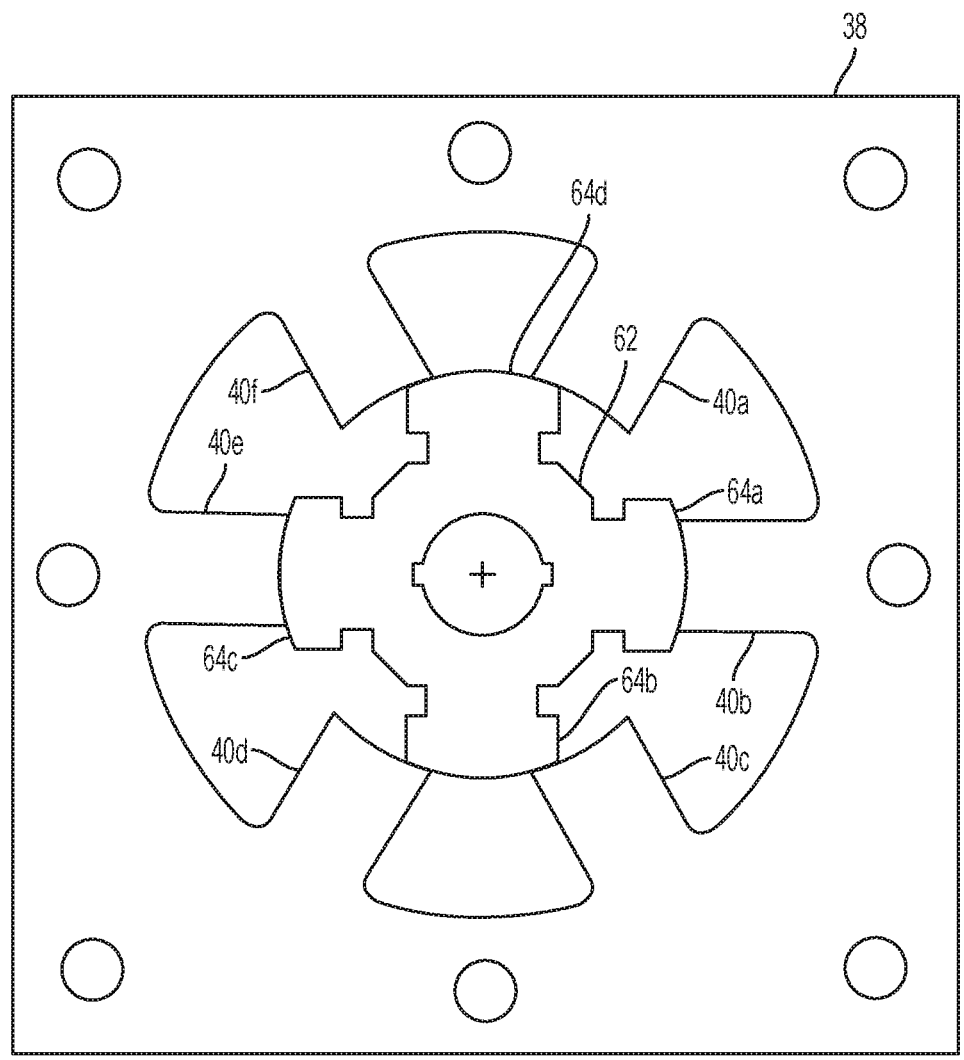
FIG. 7 illustrates a plan view of a rotor and a stator according to an embodiment of the present disclosure.

FIG. 7 illustrates the stator 38 of FIGS. 4 and 5, mated with the rotor 62 of FIG. 6. The phase coil wiring, which may be as shown in FIG. 5, is not illustrated in FIG. 7. The rotor 62 is positioned within the interior rotor cavity of the stator 38. The rotor poles 64a-64d are oriented relative to the stator poles 40a-40f such that at least one of the rotor poles is offset from a stator pole. In an embodiment in which the rotor 62 and stator 38 are used in a switched reluctance motor or variable reluctance motor, the offset of the rotor pole from one of the stator poles reduces the possibility of "lock up," in which the rotor pole 64a-64d is no longer drawn to the next respective stator pole 40a-40f in the sequence.

The stator 38 and the rotor 62, and combination thereof, as shown in FIG. 7, may be utilized with drive circuit 10. Improved efficiency of the resulting motor may be produced based on the structure of the stator 38 and the rotor 62. The motor housing 41 shown in FIG. 3A-3C may be modified to accommodate the structure of the outer periphery of the stator 38. The stator 38 and the rotor 62, and combination thereof, as shown in FIG. 7, may be utilized with any drive circuit disclosed in this application.

In one embodiment, the number of stator and rotor poles of the respective stator 38 and rotor 62 may be increased or decreased as desired. In one embodiment, the stator 38 and rotor 62 may be utilized in a 12/8 configuration, with twelve stator poles and eight rotor poles. Such embodiments may be utilized with any drive circuit disclosed in this application.

Figure 8:
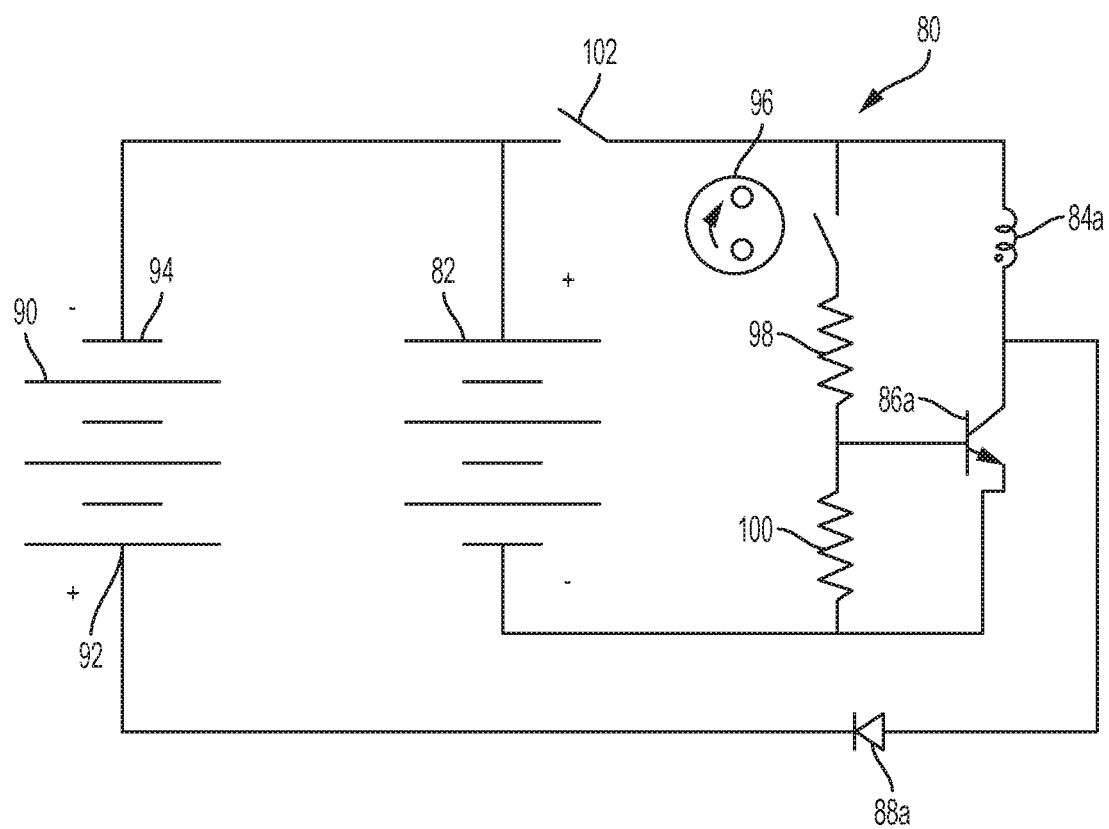
FIG. 8 illustrates a schematic diagram of a drive circuit according to an embodiment of the present disclosure.

FIG. 8 illustrates an embodiment of a drive circuit 80 according to an embodiment of the present disclosure. The drive circuit 80 may be utilized to operate a motor. The motor may be utilized to produce a mechanical output.

The drive circuit 80 may be configured similarly as the drive circuit 10 shown in FIG. 1. The drive circuit 80, however, only includes the equivalent of the battery 24 shown in FIG. 1, and does not include the equivalent of the battery 30 shown in FIG. 1. As discussed in regard to FIG. 1, the presence of the equivalent of battery 30 may or may not be utilized in certain embodiments.

The drive circuit 80 includes a power source 82 that has a similar structure and operation as described in regard to the power source 12 in FIG. 1. The power source 82 is used to supply power to phase coil 84a. Although only shown as a single phase coil 84a, additional phase coils may be connected to power source 82, in a similar manner that additional phase coils 14b and 14c are connected to power source 12 in FIG. 1.

The phase coil 84a may have a similar structure and operation as described in regard to the phase coil 14a in FIG. 1. The phase coil 84a may be coupled to the positive pole of the power source 82 such that the phase coil 84a receives electrical energy from the power source 82 to form the magnetic field. The phase coil 84a may be configured to have an electrical current pass therethrough to form a magnetic field, which may be used to impart motion to a rotor.

A switch 86a may have a similar structure and operation as described in regard to the switch 20a in FIG. 1. The switch 86a may couple the switch side or dotted side of the phase coil 84a to the negative pole of the power source 82, such that current passes through the phase coil 84a and the switch 86a to reach the negative pole of the power source 82 when the switch 86a is closed.

A diode 88a may have a similar structure and operation as described in regard to the diode 22a in FIG. 1. The diode 88a may be forward biased relative to the phase coil 84a.

A power storage device may be coupled to the switch side or dotted side of the phase coil 84a via diode 88a. The power storage device may be configured as a battery 90, and may have a similar structure and operation as the power storage device discussed in regard to FIG. 1 that comprises battery 24. The battery 90 may include two poles. As shown in FIG. 8, the battery 90 has poles of opposite polarity, including a positive pole 92 and a negative pole 94. The positive pole 92 may couple to the phase coil 84a and the negative pole 94 may couple to the positive pole of the power source 82.

Although only switch 86a and diode 88a are shown, in FIG. 8, additional switches and diodes, similar to switches 20b, 20c and diodes 22b, 22c of FIG. 1, may be coupled to additional phase coils and the battery 90, and utilized in a similar manner as the switches 20b, 20c and diodes 22b, 22c of FIG. 1.

A commutator 96 and voltage divider including two resistors 98, 100, may be used to control opening and closing of the switch 86a. The commutator 96 and voltage divider may be used as part of a controller, similar to the operation of the controller 36 discussed in regard to FIG. 1. The commutator 96 and voltage divider may also be used to control additional switches of FIG. 8, in a similar manner that controller 36 operates switches 20b, 20c in FIG. 1.

A main power switch 102 may be coupled to power source 82, and may be used to turn on or off power to the phase coil 84*a*, or additional phase coils of the circuit, if present.

In operation, when switch 86*a* is closed, current flows through the phase coil 84*a* to the negative pole of the power source 82. The current flowing through the phase coil 84*a* forms a magnetic field, which is used to impart motion to a rotor. Energy is stored in the magnetic field. When the switch 86*a* is opened, current no longer flows through the switch 86*a*. The energy of the magnetic field is transferred through the diode 88*a* to the battery 90. A resulting voltage across battery 90 charges battery 90. The energy of the magnetic field is transferred to the battery 90 and stored in battery 90.

When the switch 86*a* is again closed, the current again flows therethrough. When the switch 86*a* is then opened, the battery 90 is again charged. The energy stored in the battery 90 may be input back into the operation of the coil 84*a*, or may be returned back to the power source 82. The energy of the magnetic field accordingly may be returned to the system.

The pole 94 of the battery 90 is of an opposite polarity than the pole of the power source 82 to which it is connected. The use of the battery 90, with its pole 94 being of an opposite polarity than the pole of the power source 82, may produce a low torque ripple and a soft chopping, similar to the results shown in FIG. 2.

The battery 90 may be configured such that the voltage across the battery 90 is equal to or less than the voltage across the power source 82. Keeping the voltage of the battery 90 equal to or less than the voltage of the power source 82 may provide improved efficiency and operation of the drive circuit 80 and motor. The battery 90 may be structured in a manner such that the voltage of the battery 90 remains equal to or less than the voltage of the power source 82. In an embodiment in which power source 82 is a battery, both power source 82 and battery 90 may be configured such that the voltage across battery 90 is less than or equal to the voltage across power source 82. In one embodiment, the voltage of the battery 90 may be less than the voltage across power source 82.

Additional phase coils, switches, and diodes may be used in a multiphase configuration, as discussed in regard to the drive circuit 10 of FIG. 1. The drive circuit 80 and components thereof, may be modified in a similar manner as discussed regarding the drive circuit 10 and its components.

Figure 9:
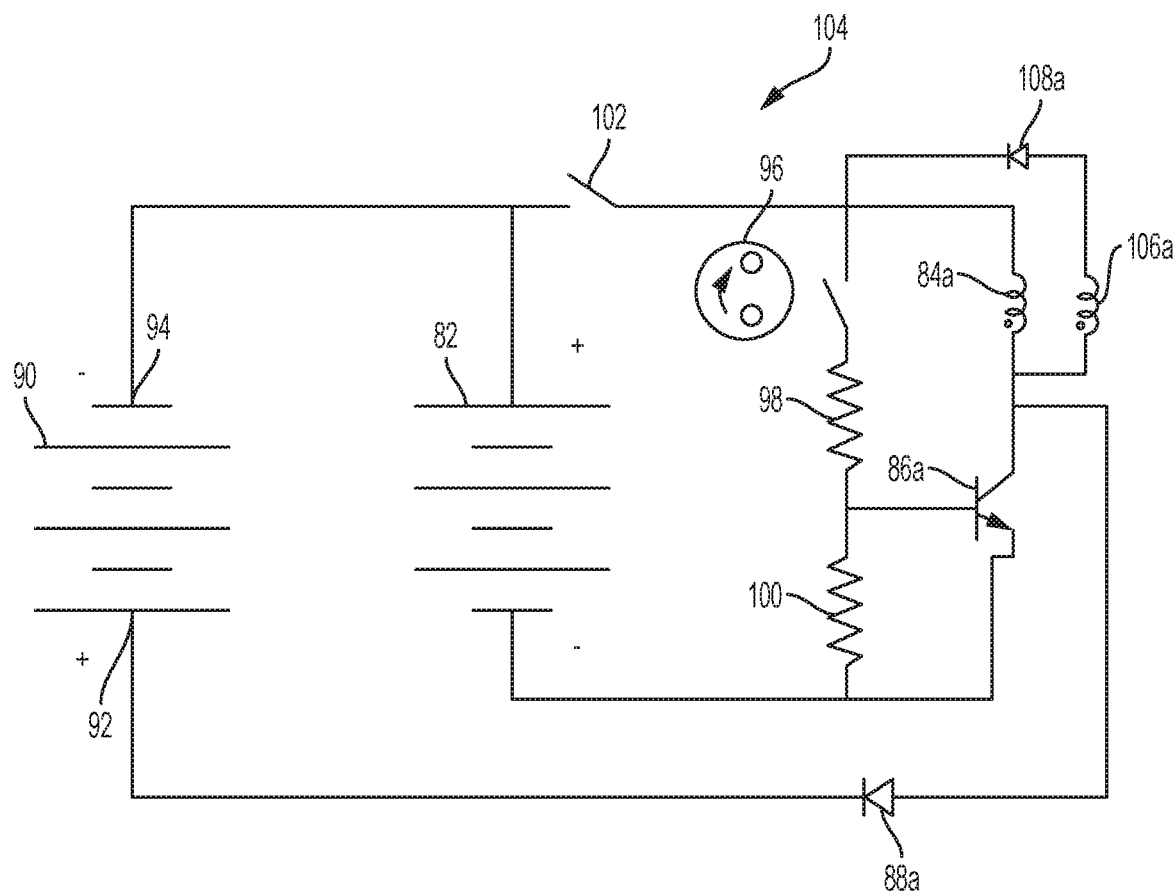
FIG. 9 illustrates a schematic diagram of a modified version of the drive circuit of FIG. 8.

FIG. 9 illustrates a variation of the drive circuit 80 shown in FIG. 8, in which drive circuit 104 includes an additional phase coil 106*a*. The additional phase coil 106*a* has its switch side or dotted side coupled to the battery 90 via diode 88*a*. The additional phase coil 106*a* has its non-switch side or undotted side coupled to the power source 82 via diode 108*a*. The diode 108*a* is forward biased relative to the phase coil 106*a*. The diode 108*a* may block current from the power source 82 from passing through the phase coil 106*a*.

The phase coil 106*a* may be configured to be passive, such that the magnetic field produced by phase coil 84*a* induces a current in the phase coil 106*a*. The phase coil 106*a* accordingly may be used to recover the energy of the magnetic field produced by phase coil 84*a*. The current induced in phase coil 106*a* may be transferred to the battery 90 via diode 88*a*. As such, improved recovery of the energy of the magnetic field may result. Phase coil 106*a* may be considered to be a secondary coil, and phase coil 84*a* may be considered to be a primary coil.

The phase coil 106*a* may be wound on the stator pole with the phase coil 84*a* in a bifilar arrangement. In other embodiments, additional windings on the stator pole (additional secondary coils) may be used to recover the energy of the magnetic field of phase coil 84*a*. In an embodiment in which multiple powered primary phase coils are utilized (in a multiphase embodiment), a corresponding additional secondary phase coil (similar to phase coil 106*a*), may be used to recover the energy of the magnetic field for each of the respective primary phase coils.

The drive circuit 104 and components thereof, may be modified in a similar manner as discussed regarding the drive circuit 10 and its components.

Figure 10:
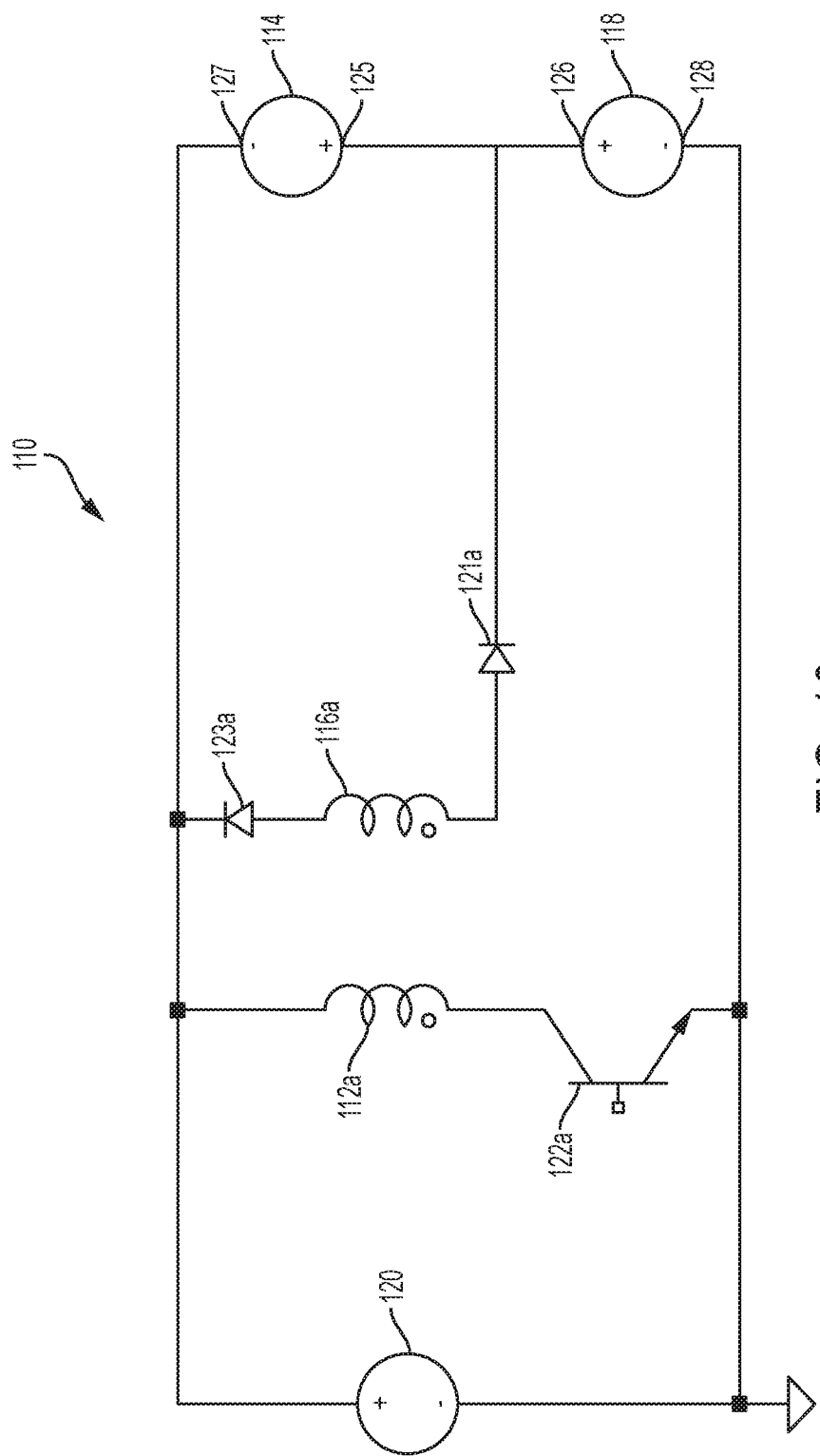
FIG. 10 illustrates a schematic diagram of a drive circuit according to an embodiment of the present disclosure.

FIG. 10 illustrates an embodiment of a drive circuit 110 according to an embodiment of the present disclosure. The drive circuit 110 may be utilized to operate a motor. The motor may be utilized to produce a mechanical output.

The drive circuit 110 may be configured similarly as the drive circuit 10 shown in FIG. 1. The drive circuit 110, however, includes a phase coil 112*a* with a dotted side or switch side that does not couple to battery 114. Rather, an additional phase coil 116*a* (or secondary phase coil) is utilized, such that the magnetic field produced by phase coil 112*a* induces a current in the phase coil 116*a*. The phase coil 116*a* accordingly may be used to recover the energy of the magnetic field produced by phase coil 112*a*. The current induced in phase coil 116*a* may be transferred to the battery 114 via diode 121*a*. As such, improved recovery of the energy of the magnetic field may result. The current induced in phase coil 116*a* may also be transferred to the battery 118 via diode 121*a*.

The drive circuit 110 includes a power source 120 that has a similar structure and operation as described in regard to the power source 12 in FIG. 1. The power source 120 is used to supply power to phase coil 112*a*. Although only shown as a single phase coil 112*a*, additional phase coils may be connected to power source 120, in a similar manner that additional phase coils 14*b* and 14*c* are connected to power source 12 in FIG. 1.

The phase coil 112*a* may have a similar structure and operation as described in regard to the phase coil 14*a* in FIG. 1. The phase coil 112*a* may be coupled to the positive pole of the power source 120 such that the phase coil 112*a* receives electrical energy from the power source 120 to form the magnetic field. The phase coil 112*a* may be configured to have an electrical current pass therethrough to form a magnetic field, which may be used to impart motion to a rotor.

A switch 122*a* may have a similar structure and operation as described in regard to the switch 20*a* in FIG. 1. The switch 122*a* may couple the switch side or dotted side of the phase coil 112*a* to the negative pole of the power source 120, such that current passes through the phase coil 112*a* and the switch 122*a* to reach the negative pole of the power source when the switch 122*a* is closed.

A diode 121*a* may have a similar structure and operation as described in regard to the diode 22*a* in FIG. 1. The diode 121*a* may be forward biased relative to the phase coil 116*a*. A diode 123*a* may be coupled between the power source 120 and the undotted side of the phase coil 116*a*. The diode 123*a* may block current from the power source 120 from passing through the phase coil 116*a*.

A power storage device may be coupled to the dotted side of the phase coil 116*a* via diode 121*a*. The power storage device may be configured as a battery 114, and may have a similar structure and operation as the power storage device discussed in regard to FIG. 1 that comprises battery 24. The battery 114 may include two poles. As shown in FIG. 10, the battery 114 has poles of opposite polarity, including a positive pole 125 and a negative pole 127. The positive pole 125 may couple to the phase coil 116a and the negative pole 127 may couple to the positive pole of the power source 120.

Another power storage device may be coupled to the switch side or dotted side of the phase coil 116a via diode 121a. The power storage device may be configured as a battery 118, and may have a similar structure and operation as the power storage device discussed in regard to FIG. 1 that comprises battery 30. The battery 118 may include two poles. As shown in FIG. 10, the battery 118 has poles of opposite polarity, including a positive pole 126 and a negative pole 128. The positive pole 126 may couple to the phase coil 116a and the negative pole 128 may couple to the negative pole of the power source 120.

Although only coils 112a, 116a, switch 122a, and diodes 121a and 123a, are shown, in FIG. 10, additional coils, switches and diodes, similar to coils 14b, 14c, switches 20b, 20c and diodes 22b, 22c of FIG. 1, may be utilized in a similar manner. Additional secondary coils 116a and diodes 123a may be utilized to recover the magnetic energy of the respective primary coils. A controller may operate the switch 122a, or multiple switches, in a similar manner as described regarding the controller 36 of FIG. 1.

In operation, when switch 122a is closed, current flows through the phase coil 112a to the negative pole of the power source 120. The diode 123a blocks current flow through the phase coil 116a. The current flowing through the phase coil 112a forms a magnetic field, which is used to impart motion to a rotor. Energy is stored in the magnetic field. When the switch is 122a opened, current no longer flows through the switch 122a. The magnetic field induces a current in the secondary phase coil 116a, which is transferred through the diode 121a to be stored as energy in the batteries 114, 118. A resulting voltage across battery 114 charges battery 114. The energy of the magnetic field is transferred to the battery 114 and stored in battery 114. A resulting voltage across battery 118 charges battery 118. The energy of the magnetic field is transferred to the battery 118 and stored in battery 118.

When the switch 122a is again closed, the current again flows therethrough. When the switch 122a is then opened, the battery 114 is again charged. The battery 118 may also be charged. The energy stored in the battery 114 may be input back into the operation of the coil 112a, or may be input into power source 120. The energy of the magnetic field accordingly may be returned to the system.

The pole 127 of the battery 114 is of an opposite polarity than the pole of the power source 120 to which it is connected. The use of the battery 114, with its pole 127 being of an opposite polarity than the pole of the power source 120, may produce a low torque ripple and a soft chopping, similar to the results shown in FIG. 2.

The battery 114 may be configured such that the voltage across the battery 114 is equal to or less than the voltage across the power source 120. Keeping the voltage of the battery 114 equal to or less than the voltage of the power source 120 may provide improved efficiency and operation of the drive circuit 110 and motor. The battery 114 may be structured in a manner such that the voltage of the battery 114 remains equal to or less than the voltage of the power source 120. In an embodiment in which power source 120 is a battery, both power source 120 and battery 114 may be configured such that the voltage across battery 114 is less than or equal to the voltage across power source 120. In one embodiment, the voltage of the battery 114 may be less than the voltage across power source 120.

Additional primary phase coils, secondary phase coils, switches, and diodes may be used in a multiphase configuration, as discussed in regard to the drive circuit 10 of FIG. 1. The drive circuit 110 and components thereof, may be modified in a similar manner as discussed regarding the drive circuit 10 and its components.

Figure 11:
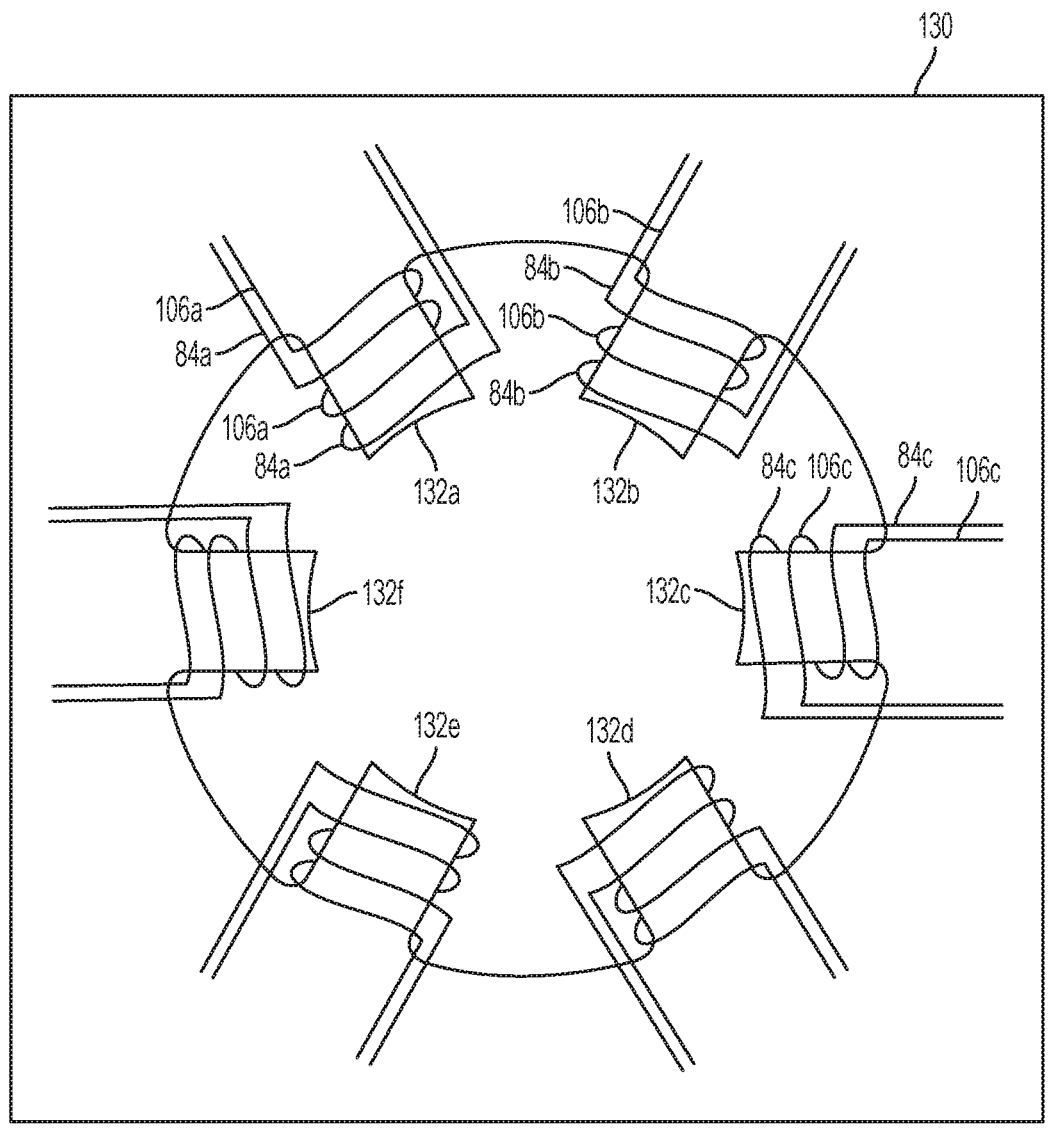
FIG. 11 illustrates a schematic diagram of a wiring diagram of a stator according to an embodiment of the present disclosure.

FIG. 11 illustrates an embodiment of phase coils 84a, 84b, 84c, 106a, 106b, 106c wrapped about the stator poles 132a, 132b, 132c, 132d, 132e, 132f of a stator 130. The phase coils 84a, 106a are those shown and described in regard to the primary phase coil 84a and secondary phase coil 106a shown in FIG. 9. The phase coils 84a, 106a may be wrapped about the stator pole 132a in a bifilar arrangement. The wiring of phase coils 84a, 106a may be connected to opposing bifilar coils on the opposing stator pole 132d.

The stator 130 may be used in a multiphase, or tri-phase, winding, such that three pairs of wires (84a and 106a; 84b and 106b; and 84c and 106c) are used. Each pair may be wrapped about a respective stator pole (84a and 106a on pole 132a; 84b and 106b on pole 132b; and 84c and 106c on pole 132c). The wiring of phase coils may be connected to opposing bifilar coils on the opposing stator poles (132d, 132e, and 132f). Each pair may include a primary coil (84a, 84b, 84c) and a secondary coil (106a, 106b, 106c), with each primary coil being structured and operating similarly as the primary coil 84a discussed in regard to FIG. 9, and each secondary coil being structured and operating similarly as the secondary coil 106a discussed in regard to FIG. 9. The phase coils 84a, 84b, 84c may be wired such that each is activated in sequence, to form rotating magnetic attraction for a rotor positioned within the interior rotor cavity. The secondary phase coils 106a, 106b, 106c may be wired to recover the energy of the magnetic field of the respective primary phase coils 84a, 84b, 84c.

The phase coils 112a, 116a of FIG. 10, may be wired in a similar manner as discussed in regard to the coils 84a, 106a of FIG. 11. Additional coils may be provided to provide a multi-phase or tri-phase winding, as discussed in regard to FIG. 11.

In other embodiment, the number of windings could increase greater than a bifilar winding, and may including a trifilar, quadrifilar, or greater number of windings.

Any of the drive circuits disclosed in this application may be modified to include additional windings (bifilar or greater) or secondary coils, in a manner disclosed in regard to FIGS. 9-11. In one embodiment, the number of stator and rotor poles of the respective stator and rotor shown in FIG. 11 may be increased or decreased as desired. In one embodiment, the stator and rotor may be utilized in a 12/8 configuration, with twelve stator poles and eight rotor poles. Such embodiments may be utilized with any drive circuit disclosed in this application.

Figure 12:
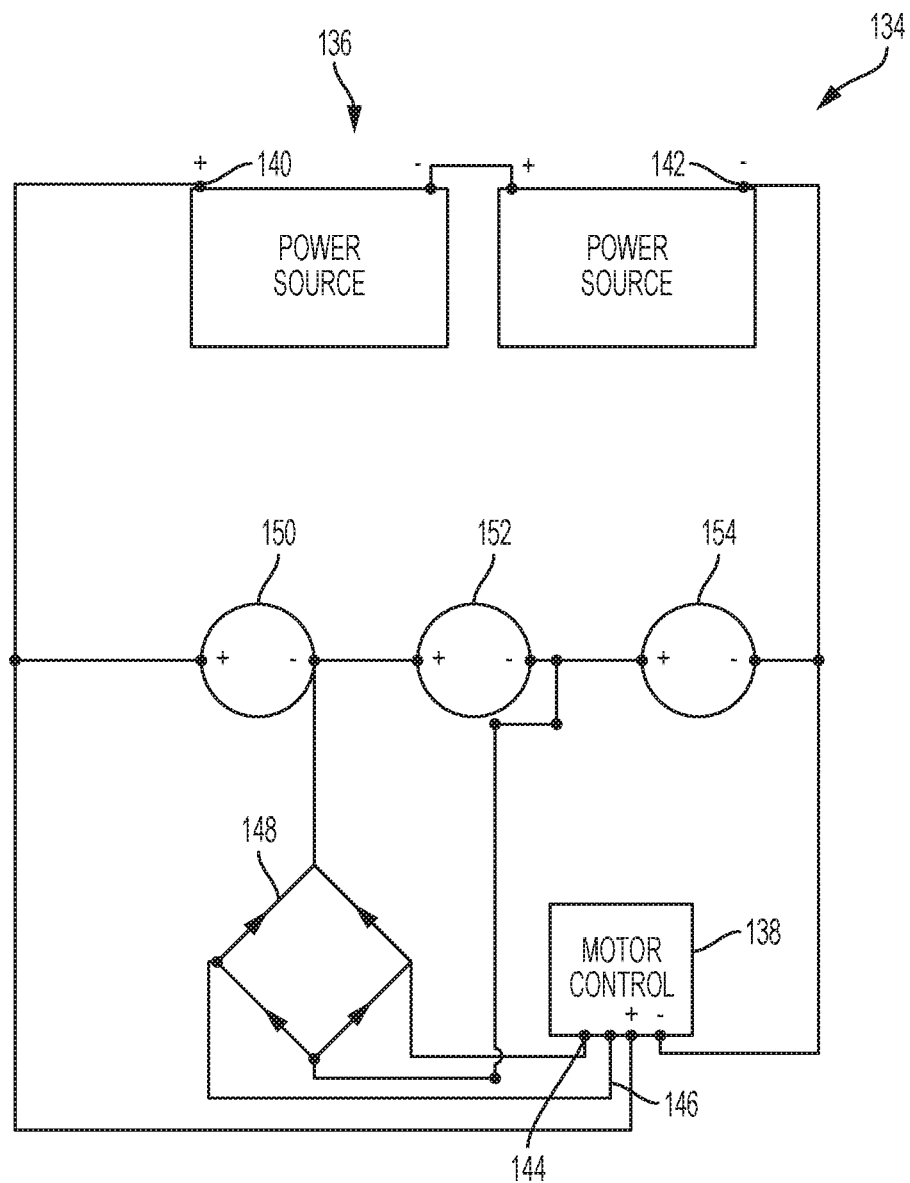
FIG. 12 illustrates a schematic diagram of a drive circuit according to an embodiment of the present disclosure.

FIG. 12 illustrates an embodiment of a drive circuit 134 according to an embodiment of the present disclosure. The drive circuit 134 may be utilized to operate a motor. The motor may be utilized to produce a mechanical output.

The drive circuit 134 may include a power source 136 used to supply power to one or more phase coils (present within motor control 138). The power source 136 may comprise a battery (multiple batteries are shown FIG. 12), a DC link, or other form of power source. In the embodiment shown in FIG. 12, the power source 136 produces a DC input to the one or more phase coils (within motor control 138). In other embodiments, an AC input may be provided by power source 136.

The power source 136 includes two poles. As shown in FIG. 12, the power source 136 has poles of opposite polarity, including a positive pole 140 and a negative pole 142.

The positive pole 140 may couple to the one or more phase coils (within motor control 138). Each of the one or more phase coils may be coupled to the positive pole 140 in a similar manner as discussed regarding any phase coil discussed in this application. The negative pole 142 may couple to each of the one or more phase coils in a similar manner as discussed regarding any phase coil discussed in this application.

The motor control 138 may include a rotor, a stator, phase coils, switches, diodes, and a controller, which may be configured in a manner discussed in this application. The motor control 138 may be configured to provide electrical energy outputs 144, 146. The electrical energy outputs 144, 146 may be drawn from the energy of the magnetic field of one of the coils, in a manner discussed in this application. The outputs 144, 146 may comprise AC current, due to oscillations in the energy provided by the magnetic field of the respective coil.

The outputs 144, 146 may be passed through a rectifier 148. The rectifier 148 may be configured to rectify the AC current, to provide a form of energy suitable for charging the power storage devices 150, 152, 154. Each of the power storage devices 150, 152, 154 may comprise a capacitor. In other embodiments, each of the power storage devices 150, 152, 154 may comprise a battery, or another form of power storage device. Combinations of various types of power storage devices may be used.

The rectifier 148 may comprise a full wave rectifier as shown in FIG. 12, or in other embodiments may comprise another form of rectifier.

The power storage devices 150, 152, 154 may store the energy passed through the rectifier 148. The power storage devices 150, 152, 154 may receive the energy produced by the magnetic field of the coils. The power storage device 150, 152, 154 may receive the rectified current from the rectifier, and store energy resulting from the rectified current. The power storage devices 150, 152, 154 may pass the energy back to the power source 136 or back to the coils (in motor control 138). In other embodiments, the other drive circuits disclosed herein, including the drive circuit 10 of FIG. 1, may be modified to include a rectifier such as a full wave rectifier, for rectifying the current resulting from the magnetic field of a phase coil.

The power storage devices 150, 152, 154 may be configured such that the voltage across power storage devices 150, 152, 154 is equal to or less than the voltage across the power source 136. Keeping the voltage of the power storage devices 150, 152, 154 equal to or less than the voltage of the power source 136 may provide improved efficiency and operation of the drive circuit 134 and motor. The power storage devices 150, 152, 154 may be structured in a manner such that the voltage of the power storage devices 150, 152, 154 remains equal to or less than the voltage of the power source 136. In one embodiment, the voltage of the power storage devices 150, 152, 154 may be less than the voltage across power source 136.

Figure 13:
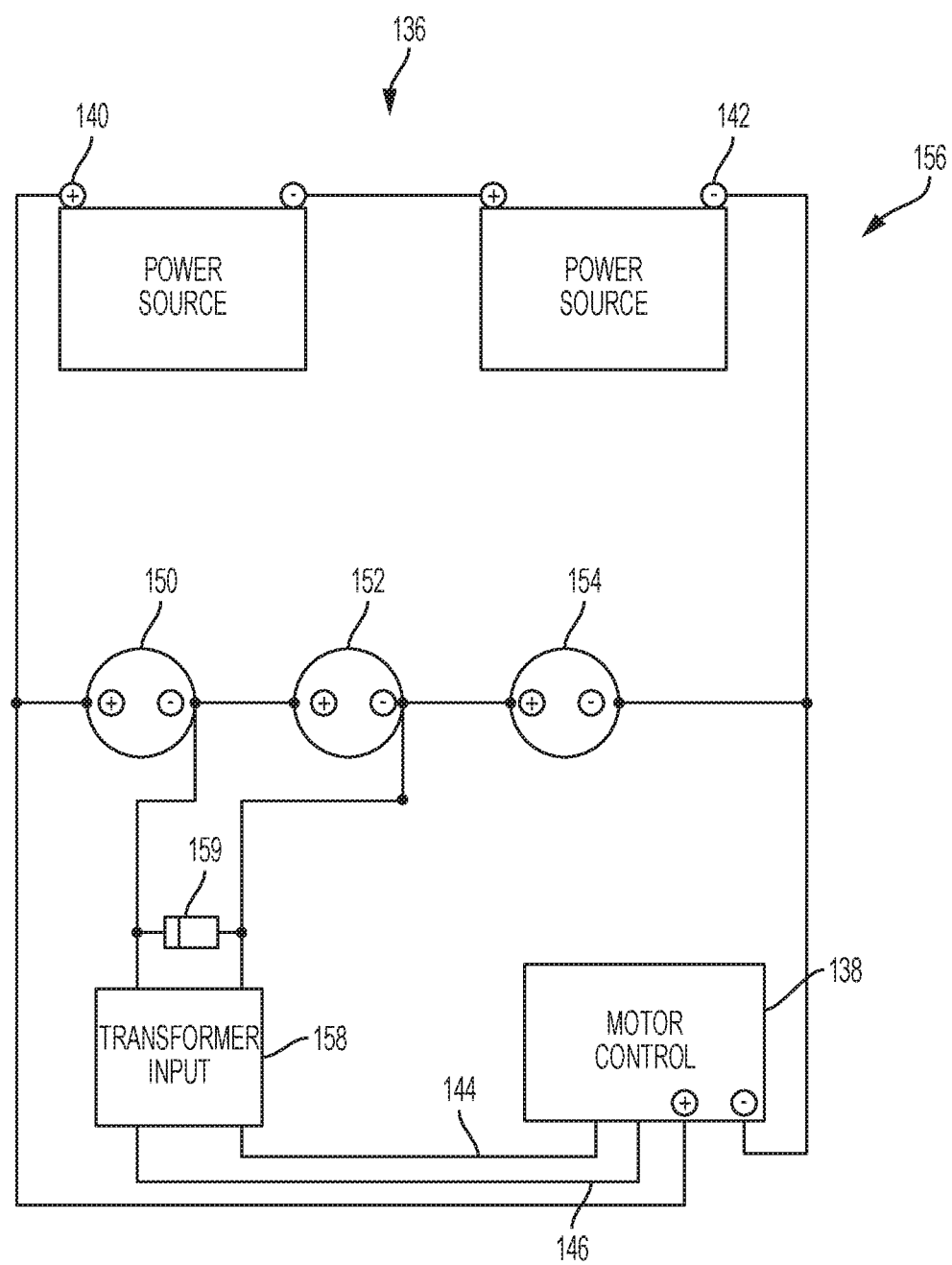
FIG. 13 illustrates a schematic diagram of a modified version of the drive circuit of FIG. 12.

FIG. 13 illustrates a variation of the embodiment shown in FIG. 12. In the embodiment shown in FIG. 13, the positive pole 140 of the power source 136 couples to the positive input of the motor control 138. The negative pole 142 of the power source 136 couples to the negative input of the motor control 138. The outputs 144, 146 of the motor control pass through a transformer 158 prior to being rectified by rectifier 159. In this manner, the AC current provided by the outputs 144, 146 may be varied by the transformer 158 prior to being rectified by the rectifier 159. Similar to the embodiment discussed in regard to FIG. 12, the rectifier 159 may be configured to rectify the AC current, to provide a form of energy suitable for charging the power storage devices 150, 152, 154. Rectifier 159 in FIG. 13 is shown as a diode, and in other embodiments may comprise another form a rectifier, such as a full wave rectifier shown in FIG. 12. In other embodiments, the other drive circuits disclosed herein, including the drive circuit 10 of FIG. 1, may be modified to include a transformer for varying a current resulting from the magnetic field of a phase coil. The transformer may provide varied current to a rectifier.

The drive circuits disclosed herein may be used in combination with a rotor and stator to produce a desired motor. The scope of this disclosure is not limited to the devices and systems disclosed herein, but additionally includes the methods of providing these devices and systems, as well as the method of operating these devices and systems. For example, a method may include operating or providing a motor having any of the drive circuits. The motor may be operated such that the voltage of a recovery power storage device is less than or equal to, or only less than, the voltage of a power source. The method may include operating the motor such that the energy of a power storage device (which may comprise one or more batteries) is returned back to the power source or back into the coils.

The drive circuits, rotors, and stators discussed herein may not only be used in a switched reluctance motor or variable switched reluctance motor, but may also be used in an AC inductance motor configuration, or a permanent magnet motor configuration, among other motor types.

The drive circuits, motors, rotors, and stators disclosed herein may beneficially be used off-grid, with a power source such as a solar panel as a source.

Any of the drive circuits, motors, rotors, and stators may be used in a variety of fields, such as industrial control, automotive, consumer, office, e-bikes, rickshaws, and water pumping, among others.

The industrial control fields may include power supply inverters, CNC machines, UPS (uninterruptable power supply), motor control, motion controllers, robotics and automation systems, elevators, vibratory feeds, and cutting spindles, among others.

The automotive fields may include brake by wire/ABS, active suspension, seat and mirror control, and electronic power steering, among others.

The consumer fields may include washing machines, dishwashers, air conditioning, refrigerator and freezer compressors, and compressors, among others.

The office fields may include tape drives, printers, copiers, magnetic optical drives, among others.

The water pumping fields may include pools, spas, and farms (pumping for crops), among others.

Features of the drive circuits, motors, rotors, and stators, and other components, disclosed herein, may be substituted, combined, or excluded to produce a desired result.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A drive circuit for a motor comprising:
    a power source having a first pole and a second pole;
    a phase coil coupled to the first pole of the power source, the phase coil configured to receive electrical energy from the power source to form a magnetic field for imparting motion to a rotor;
    a switch coupling the phase coil to the second pole of the power source; and
    a battery having a first pole and a second pole, the first pole of the battery configured to receive energy of the magnetic field of the phase coil, the second pole of the battery being coupled to the first pole of the power source and having a polarity that is opposite a polarity of the first pole of the power source;
    wherein a voltage of the battery is equal to or less than a voltage of the power source.

2. The drive circuit of claim 1, wherein the first pole of the battery is configured to receive the energy of the magnetic field of the phase coil from between the switch and the phase coil.

3. The drive circuit of claim 1, wherein the first pole of the battery is coupled to the phase coil.

4. The drive circuit of claim 1, wherein the switch is configured to pass current from the phase coil to the second pole of the power source when the switch is closed.

5. The drive circuit of claim 1, wherein the battery is configured to return energy received from the magnetic field of the phase coil back to the power source.

6. The drive circuit of claim 1, wherein the battery is configured to receive the energy of the magnetic field of the phase coil when the switch is open.

7. The drive circuit of claim 1, wherein the battery is a first battery, and the drive circuit further comprises:
    a second battery having a first pole and a second pole, the first pole of the second battery coupled to the phase coil and configured to receive energy of the magnetic field of the phase coil, the second pole of the second battery being coupled to the second pole of the power source and having a polarity that is the same as a polarity of the second pole of the power source.

8. The drive circuit of claim 7, wherein the second pole of the second battery has a negative polarity and the second pole of the power source has a negative polarity.

9. The drive circuit of claim 1, wherein the phase coil is a first phase coil, and the drive circuit further comprises:
    a second phase coil coupled to the first pole of the power source, the second phase coil configured to have a current induced by the magnetic field of the first phase coil, and
    the first pole of the battery is configured to receive the current of the second phase coil.

10. The drive circuit of claim 1, wherein the phase coil is coupled to a stator of the motor.

11. The drive circuit of claim 1, wherein the second pole of the battery has a negative polarity and the first pole of the power source has a positive polarity.

12. The drive circuit of claim 1, wherein the phase coil is a first phase coil, the switch is a first switch, and the drive circuit further comprises:
a second phase coil coupled to the first pole of the power source, the second phase coil configured to receive electrical energy from the power source to form a magnetic field for imparting motion to a rotor;
a second switch coupling the second phase coil to the second pole of the power source;
a third phase coil coupled to the first pole of the power source, the third phase coil configured to receive electrical energy from the power source to form a magnetic field for imparting motion to a rotor; and
a third switch coupling the third phase coil to the second pole of the power source; and
wherein the first pole of the battery is configured to receive energy of the magnetic field of the second phase coil and energy of the magnetic field of the third phase coil.

13. The drive circuit of claim 12, further comprising a controller for opening and closing each of the first switch, the second switch, and the third switch.

14. A motor comprising:
a rotor;
a power source having a first pole and a second pole;
a stator including a phase coil coupled to the first pole of the power source, the phase coil configured to receive electrical energy from the power source to form a magnetic field for imparting motion to the rotor;
a switch coupling the phase coil to the second pole of the power source; and
a battery having a first pole and a second pole, the first pole of the battery configured to receive energy of the magnetic field of the phase coil, the second pole of the battery being coupled to the first pole of the power source and having a polarity that is opposite a polarity of the first pole of the power source;
wherein a voltage of the battery is equal to or less than a voltage of the power source.

15. A method comprising:
operating a motor having a drive circuit, the drive circuit including:
a power source having a first pole and a second pole;
a phase coil coupled to the first pole of the power source, the phase coil configured to receive electrical energy from the power source to form a magnetic field for imparting motion to a rotor;
a switch coupling the phase coil to the second pole of the power source; and
a battery having a first pole and a second pole, the first pole of the battery configured to receive energy of the magnetic field of the phase coil, the second pole of the battery being coupled to the first pole of the power source and having a polarity that is opposite a polarity of the first pole of the power source; and
maintaining a voltage of the battery to be less than a voltage of the power source.

16. The method of claim 15, wherein the first pole of the battery receives the energy of the magnetic field of the phase coil from between the switch and the phase coil.

17. The method of claim 16, wherein the step of operating the motor includes returning energy from the battery back to the power source.

18. A drive circuit for a motor comprising:
a power source having a first pole and a second pole;
a phase coil coupled to the first pole of the power source, the phase coil configured to receive electrical energy from the power source to form a magnetic field for imparting motion to a rotor;
a switch coupling the phase coil to the second pole of the power source;
a rectifier coupled to the phase coil and configured to rectify a current resulting from the magnetic field of the phase coil to produce a rectified current; and
a power storage device configured to receive the rectified current from the rectifier, and store energy resulting from the rectified current;
wherein a voltage of the power storage device is equal to or less than a voltage of the power source.

19. The drive circuit of claim 18, wherein the rectifier is a full wave rectifier.

20. The drive circuit of claim 18, further comprising a transformer coupled between the phase coil and the rectifier, the transformer configured to vary a current resulting from the magnetic field of the phase coil to produce the current that is rectified by the rectifier.

* * * * *